(12) United States Patent
Tate et al.

(10) Patent No.: US 9,273,728 B2
(45) Date of Patent: Mar. 1, 2016

(54) ROLLING BEARING HAVING RINGS WITH STEPPED SURFACES OPPOSITE TO THE RACEWAYS

(71) Applicant: Schaeffler Technologies GmbH & Co. KG, Herzogenaurach (DE)

(72) Inventors: Shaun Tate, Grand Blanc, MI (US); Chad Labelle, Troy, MI (US); Stephen Carr, Waterford, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/480,031

(22) Filed: Sep. 8, 2014

(65) Prior Publication Data

US 2015/0071579 A1  Mar. 12, 2015

Related U.S. Application Data

(60) Provisional application No. 61/875,395, filed on Sep. 9, 2013.

(51) Int. Cl.
| | |
|---|---|
| *F16C 19/18* | (2006.01) |
| *F16C 33/58* | (2006.01) |
| *F16C 19/36* | (2006.01) |
| *F16C 19/50* | (2006.01) |

(52) U.S. Cl.
CPC ............. *F16C 33/586* (2013.01); *F16C 19/182* (2013.01); *F16C 19/364* (2013.01); *F16C 19/505* (2013.01); *F16C 33/583* (2013.01)

(58) Field of Classification Search
CPC .............. F16C 19/18; F16C 19/181–19/187; F16C 19/49–19/497; F16C 19/542; F16C 19/543; F16C 19/505; F16C 33/58; F16C 33/583; F16C 33/585; F16C 33/586
See application file for complete search history.

(56) References Cited

U.S. PATENT DOCUMENTS

| | | | | |
|---|---|---|---|---|
| 1,667,348 A | * | 4/1928 | Foley | 384/552 |
| 1,687,755 A | * | 10/1928 | Foley | 384/454 |
| 1,687,756 A | * | 10/1928 | Foley | 384/453 |
| 3,698,777 A | * | 10/1972 | McCoy | 384/467 |
| 4,668,111 A | * | 5/1987 | Kapaan | 384/544 |
| 5,114,248 A | * | 5/1992 | Harsdorff | 384/473 |
| 6,769,809 B2 | * | 8/2004 | Maret | 384/512 |
| 8,282,288 B2 | * | 10/2012 | Dlugai et al. | 384/544 |
| 8,341,843 B2 | * | 1/2013 | Shibuya et al. | 29/898 |
| 8,425,122 B2 | * | 4/2013 | Bohr et al. | 384/568 |
| 8,668,391 B2 | * | 3/2014 | Felis | 384/512 |
| 2009/0074343 A1 | * | 3/2009 | Morita et al. | 384/548 |
| 2009/0263064 A1 | * | 10/2009 | Baer et al. | 384/512 |
| 2010/0150487 A1 | * | 6/2010 | Beck et al. | 384/494 |

(Continued)

FOREIGN PATENT DOCUMENTS

EP    2801729 A2 * 11/2014

*Primary Examiner* — Alan B Waits
(74) *Attorney, Agent, or Firm* — Volpe and Koenig, P.C.

(57) ABSTRACT

A rolling bearing is provided that includes an outer ring having a first portion which includes a first raceway and a second portion that includes a second raceway that has a larger diameter than the first raceway. An outer diameter of the first portion of the outer ring is less than an outer diameter of the second portion of the outer ring. The rolling bearing includes an inner ring having a first portion that includes a first raceway and a second portion that includes a second raceway that has a larger diameter than the first raceway. An inner diameter of the first portion of the inner ring is less than an inner diameter of the second portion of the inner ring.

14 Claims, 4 Drawing Sheets

(56) References Cited

U.S. PATENT DOCUMENTS

| | | | |
|---|---|---|---|
| 2011/0268381 A1* | 11/2011 | Hamada et al. | 384/569 |
| 2013/0285438 A1* | 10/2013 | Horn et al. | 301/110 |
| 2013/0287328 A1* | 10/2013 | Frank | 384/476 |
| 2014/0050433 A1* | 2/2014 | Dittmar et al. | 384/551 |
| 2015/0043850 A1* | 2/2015 | Mochizuki | 384/455 |

* cited by examiner

ROLLING BEARING HAVING RINGS WITH STEPPED SURFACES OPPOSITE TO THE RACEWAYS

INCORPORATION BY REFERENCE

The following documents are incorporated herein by reference as if fully set forth: U.S. Provisional Application No. 61/875,395, filed Sep. 9, 2013.

FIELD OF INVENTION

This application is generally related to rolling bearings and more particularly related to reducing the weight of the inner and outer rings of such rolling bearings.

BACKGROUND

Rolling bearings are widely used in various mechanical applications, including the automotive field. One type of rolling bearing is an angular contact rolling bearing. Tandem ball bearings are a type of angular contact rolling bearing and include two sets of rolling elements that run on axially and radially spaced apart raceways defined on an inner and outer ring. Tapered roller bearings are another type of angular contact rolling bearing and include a single inner and outer raceway with a plurality of rolling elements located therebetween. Both angular contact tandem roller bearings and tapered roller bearings are typically mounted on a shaft and abut a housing on an outer surface for supporting axial and radial loads. In both angular contact tandem rolling bearings and tapered roller bearings, the inner and outer rings must have proper contact with the housing and shaft to keep the rolling bearing assembled and working properly. Existing angular contact rolling bearings include inner and outer rings with large cross sectional areas for abutting the housing and shaft, and are generally rectilinear in cross-section, sometimes including radiuses or chamfered edge regions to allow a tight fit as well as provide for easier handling.

It would be desirable reduce the cross sectional areas of the inner and outer rings to reduce the mass of the angular contact rolling bearing while still providing adequate abutment surfaces for mounting the inner and outer rings between the shaft and housing. Additionally, reducing the cross sectional area of a rolling bearing would also lower the amount of material required to form the rolling bearing, reducing the cycle time to form the inner and outer rings, as well as post formation processing. The angular contact rolling bearing with the reduced cross sectional area should still provide proper stiffness and loading capacity to support the anticipated rolling bearing loads.

SUMMARY

An angular contact tandem rolling bearing is disclosed. The angular contact tandem rolling bearing includes an outer ring having a first portion which includes a first raceway and a second portion that includes a second raceway that has a larger diameter than the first raceway. An outer diameter of the first portion of the outer ring is less than an outer diameter of the second portion of the outer ring. The angular contact tandem roller bearing preferably also includes an inner ring having a first portion which includes a first raceway and a second portion that includes a second raceway that has a larger diameter than the first raceway. Preferably this allows the outer ring to have a generally uniform thickness. An inner diameter of the first portion of the inner ring is less than an inner diameter of the second portion of the inner ring. This also allows the inner ring to have a generally more uniform thickness than the prior art. Those skilled in the art will recognize that angular contact bearings having inner and/or outer rings of this type can be provided.

A tapered roller bearing is also disclosed. The tapered roller bearing includes an outer ring having a first axial end portion which includes a first portion of an outer raceway and a second axial end portion that includes a second portion of the outer raceway that has a larger diameter than the first portion of the outer raceway. An outer diameter of the first axial end portion of the outer ring is less than an outer diameter of the second axial end portion of the outer ring. Preferably this allows the outer ring to have a generally uniform thickness. The tapered roller bearing preferably also includes an inner ring having a first axial end portion that includes a first portion of an inner raceway and a second axial end portion that includes a second portion of the inner raceway that has a larger diameter than the first portion of the inner raceway. An inner diameter of the first axial end portion of the inner ring is less than an inner diameter of the second axial end portion of the inner ring. This also allows the inner ring to have a generally more uniform thickness than the prior art. Those skilled in the art will recognize that tapered roller bearings having inner and/or outer rings of this type can be provided.

Preferred arrangements with one or more features of the invention are described below and in the claims.

DETAILED DESCRIPTION OF THE PREFERRED EMBODIMENTS

Figure 1:
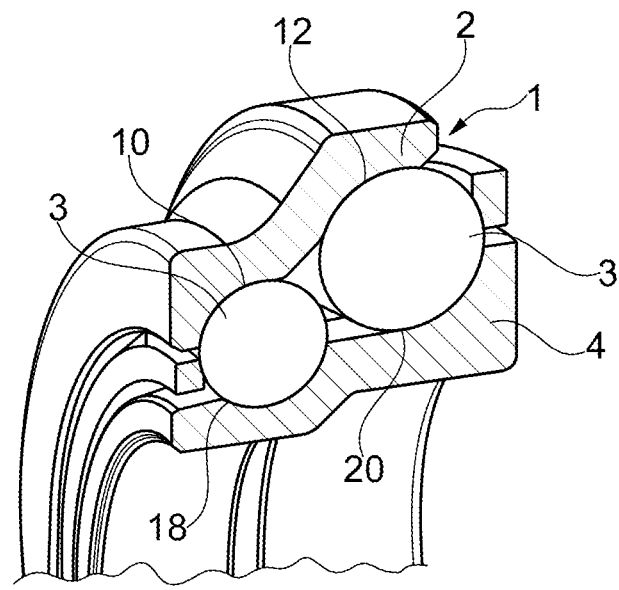
FIG. 1 is a cross-sectional perspective view of an angular contact tandem rolling bearing according to the invention.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, or c, or combinations thereof. The terminology includes the words specifically noted above, derivates thereof, and words of similar import.

Figure 2:
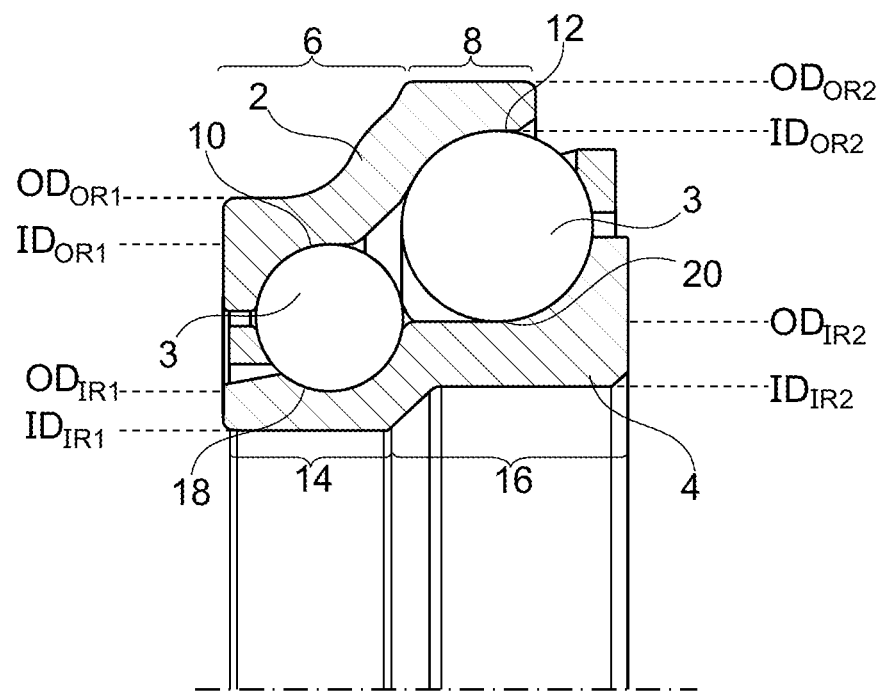
FIG. 2 is a cross-sectional view of the angular contact tandem rolling bearing of FIG. 1.
Figure 5:
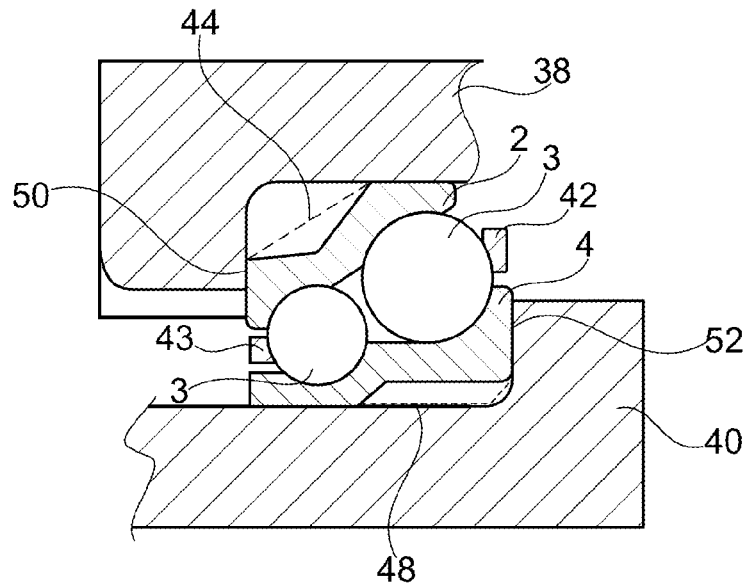
FIG. 5 is a cross-section view of an angular contact tandem rolling bearing mounted with a housing and a shaft.
Figure 6A:
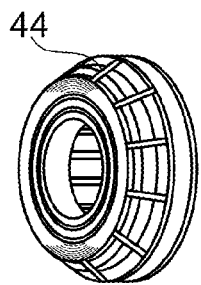
FIGS. 6A and 6B are perspective views of alternative embodiments of inner and outer rings that include ribs.
Figure 6B:
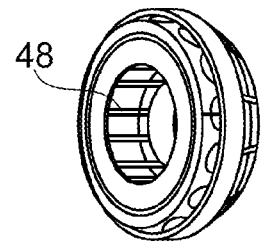
Figure 6C:
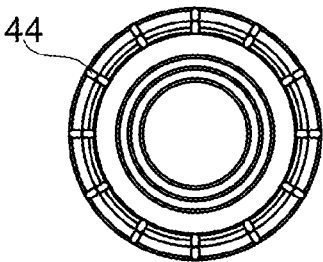
FIGS. 6C-6E are planar views of alternative embodiments of the inner and outer rings that include ribs.
Figure 6D:
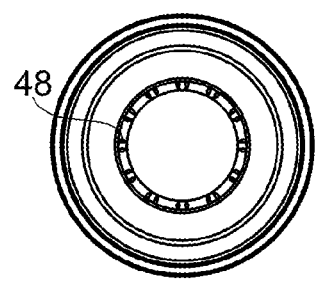
Figure 6E:
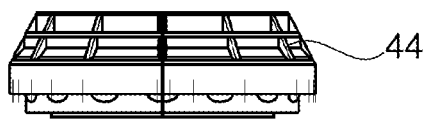

FIGS. 1 and 2 show a preferred embodiment of an angular contact tandem rolling bearing 1 with a reduced cross section according to the present invention. The tandem rolling bearing 1 includes an outer ring 2 and an inner ring 4. The outer and inner rings 2, 4 are each preferably formed as unitary parts from steel. One of ordinary skill in the art recognizes that other materials can be used to produce the inner and outer rings 2, 4. As shown in FIG. 5, the tandem rolling bearing 1 can be mounted between a housing 38 and a shaft 40, and a first and second cage 42, 43 can be provided for two sets of rolling elements 3. The two sets of rolling elements 3 run on raceways 10, 12, 18, 20 of the inner and outer rings 2, 4. The outer ring 2 has a first portion 6 which includes a first raceway 10, and a second portion 8 which includes a second raceway 12 that has a larger diameter than the first raceway 10. As shown in FIG. 2, the first portion 6 of the outer ring 2 at least partially axially overlaps with the first raceway 10, and the second portion 8 of the outer ring 2 at least partially axially overlaps with the second raceway 12. An outer diameter of the first portion of the outer ring ($OD_{OR1}$) is less than an outer diameter of the second portion of the outer ring ($OD_{OR2}$). The radial difference in the outer diameters of the first portion of the outer ring and the second portion of the outer ring creates a step in a radially outer surface of the outer ring 2. This step reduces the cross section of the outer ring 2 while still providing support for the outer ring 2 in both the axial and radial direction against the housing 38. This allows the outer ring 2 to have a generally more uniform thickness than the known prior art, which makes manufacturing, for example by forging, easier as well as reduces the material requirements. As used herein, a generally more uniform thickness means that the ratio of the thickest and thinnest portions of the outer ring in the area of the raceways is no more than about 2:1. In one preferred arrangement, the outer diameter of the first portion of the outer ring ($OD_{OR1}$) can be less than an inner diameter of the second portion of the outer ring ($ID_{OR2}$). This arrangement allows groups of outer rings to nest with each other to reduce the space required for stacking the outer rings during transportation and storage. The radial offset between the first portion 6 of the outer ring 2 and the second portion 8 of the outer ring 2 can vary depending on the application and required stiffness and load carrying capacity of the rolling bearing.

The inner ring 4 of the tandem rolling bearing 1 has a first portion 14 that includes a first raceway 18 and a second portion 16 that includes a second raceway 20 that has a larger diameter than the first raceway 18. As shown in FIG. 2, the first portion 14 of the inner ring 4 at least partially axially overlaps with the first raceway 18, and the second portion 16 of the inner ring 4 at least partially axially overlaps with the second raceway 20. An inner diameter of the first portion of the inner ring ($ID_{IR1}$) is preferably less than an inner diameter of the second portion of the inner ring ($ID_{IR2}$). The radial difference in the inner diameters of the first portion of the inner ring and the second portion of the inner ring creates a step in a radially inner surface of the inner ring 4. This step reduces the cross section of the inner ring 4 while still providing support for the inner ring 4 in both the axial and radial direction against the shaft 40. In one preferred arrangement, an outer diameter of the first portion of the inner ring ($OD_{IR1}$) is less than or equal to the inner diameter of the second portion of the inner ring ($ID_{IR2}$). In another preferred arrangement, a rib located adjacent to the first raceway 18 of the inner ring 4 has an outer diameter that is less than the inner diameter of the second portion of the inner ring ($ID_{IR2}$), which allows groups of inner rings to nest with each other to reduce the space required for stacking the inner rings during transportation and storage. The radial offset between the first portion 14 of the inner ring 4 and the second portion 16 of the inner ring 4 can vary depending on the application and required stiffness and load carrying capacity of the rolling bearing.

One of ordinary skill in the art will recognize from the present disclosure that one or both of the rings of the tandem rolling bearing can include the radial offset in the respective portions. In a preferred embodiment, an axial end surface of the first portion 6 of the outer ring 2 abuts the housing 38 and an outer radial end surface of the second portion 8 of the outer ring 2 abuts the housing 38. In a preferred embodiment, an inner radial end surface of the first portion 14 of the inner ring 4 abuts the shaft 40, and an axial end surface of the second portion 16 of the inner ring 4 abuts the shaft 40. The axial end surfaces 50, 52 are dimensioned to provide the required stability of the bearing, for a particular application.

Figure 7A:
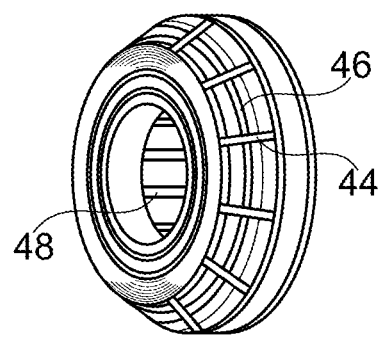
FIG. 7A is a perspective view of an alternative embodiment of the inner and outer rings that include ribs.
Figure 7B:
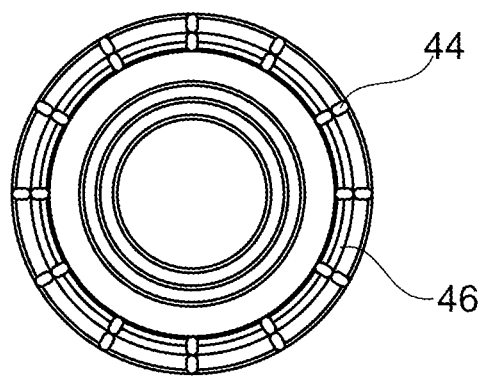
FIGS. 7B and 7C are planar views of an alternative embodiment of the inner and outer rings that include ribs.
Figure 7C:
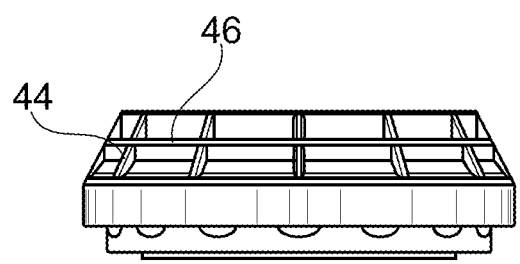

As shown in FIGS. 6A-6E, a radially outer surface of the outer ring 2 can include a plurality of ribs 44 that are spaced circumferentially apart from each other and extend axially between the first portion 6 of the outer ring 2 and the second portion 8 of the outer ring 2. The ribs are preferably formed integrally with the outer ring 2 and can have a profile that partially fills the step between the outer diameter of the first and second portions 6, 8 as shown in dashed lines in FIG. 5, or that entirely fills the step area. As shown in FIGS. 7A-7C, a circumferential rib 46 can be provided that intersects the plurality of ribs 44. A radially inner surface of the inner ring 4 can include a plurality of ribs 48 spaced circumferentially apart from each other that extend axially between the first portion 14 of the inner ring 4 and the second portion 16 of the inner ring 4. The ribs are preferably formed integrally with the inner ring 4 and can have a profile that partially fills the step between the inner diameter of the first and second portions 14, 16, or that entirely fills the step area. One of ordinary skill in the art will recognize from the present disclosure multiple configurations of reinforcing ribs can be provided to improve stiffness and loading capacity of the rolling bearing depending on the application.

Figure 3:
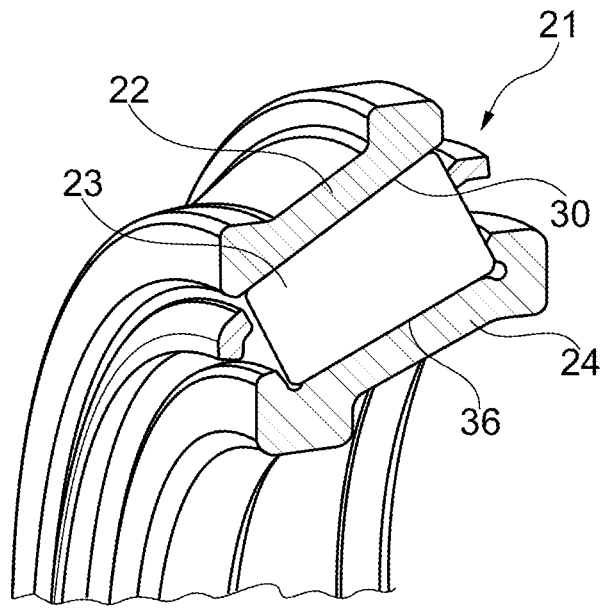
FIG. 3 is a cross-sectional perspective view of a tapered roller bearing according to the invention.
Figure 4:
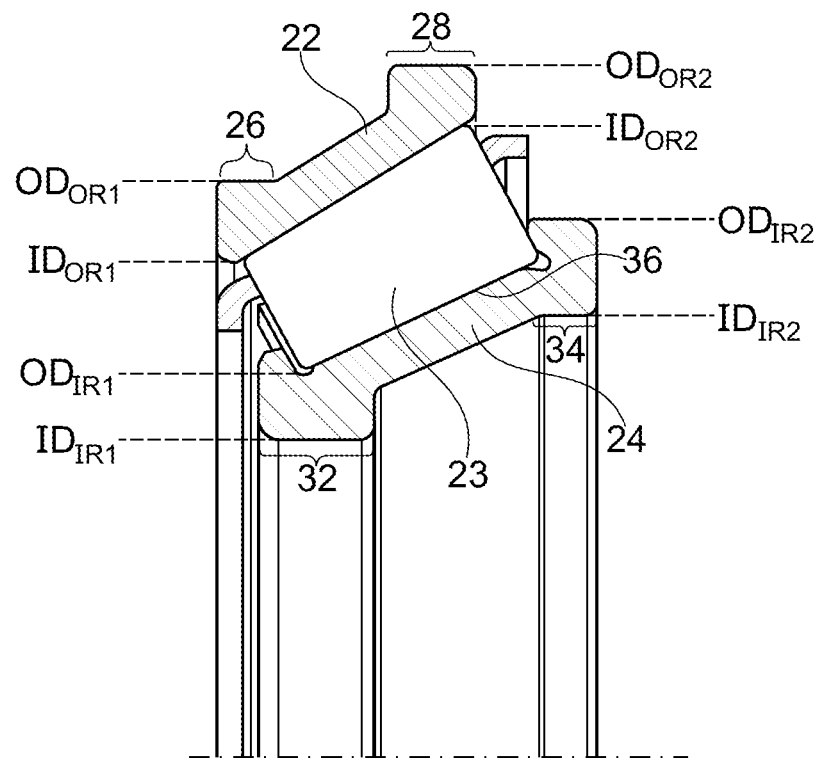
FIG. 4 is a cross-sectional view of the tapered roller bearing of FIG. 3.

FIGS. 3 and 4 show a preferred embodiment of a tapered roller bearing 21 with a reduced cross section according to the present invention. The tapered roller bearing 21 includes an outer ring 22 and an inner ring 24. The outer and inner rings 22, 24 are each preferably formed as unitary parts from steel. A plurality of rolling elements 23 run on an inner raceway 36 formed on the inner ring 24 and an outer raceway 30 formed on the outer ring 22. The outer ring 22 includes a first axial end portion 26 that includes a first portion of the outer raceway and a second axial end portion 28 includes a second portion of the outer raceway that has a larger diameter than the first portion of the outer raceway. As clearly shown in FIG. 4, an outer diameter of the first axial end portion of the outer ring ($OD_{OR1}$) is less than an outer diameter of the second axial end portion of the outer ring ($OD_{OR2}$). The radial difference in the outer diameters of the first axial end portion of the outer ring ($OD_{OR1}$) and the second axial end portion of the outer ring ($OD_{OR2}$) creates a step or sloped surface in a radially outer surface of the outer ring 22 that reduces the cross sectional area of the outer ring 22. This allows the outer ring 22 to have a generally more uniform thickness than the known prior art, which makes manufacturing, for example by forging, easier as well as reduces the material requirements. In one preferred arrangement, the outer diameter of the first axial end portion of the outer ring ($OD_{OR1}$) can be less than an inner diameter of the second axial end portion of the outer ring ($ID_{OR2}$). This arrangement allows groups of outer rings to nest with each other to reduce the space required for stacking the outer rings during transportation and storage. The radial offset between the first and second axial end portions 26, 28 of the outer ring 22 can vary depending on the application.

The inner ring 24 of the tapered roller bearing 21 has a first axial end portion 32 that includes a first portion of an inner raceway and a second axial end portion 34 that includes a second portion of the inner raceway that has a larger diameter than the first portion of the inner raceway. An inner diameter of the first axial end portion of the inner ring ($ID_{IR1}$) is less than an inner diameter of the second axial end portion of the inner ring ($ID_{IR2}$). The radial difference in the inner diameter of the first axial end portion of the inner ring ($ID_{IR1}$) and the inner diameter of the second axial end portion of the inner ring ($ID_{IR2}$) creates a step or sloped surface in a radially inner surface of the inner ring 24 that reduces the cross sectional area of the inner ring 24. In one preferred arrangement, an outer diameter of the first axial end portion of the inner ring ($OD_{IR1}$) is less than an inner diameter of the second axial end portion of the inner ring ($ID_{IR2}$). In another preferred arrangement, a rib located adjacent to the first axial end portion 32 of the inner ring 24 has an outer diameter that is less than the inner diameter of the second axial end portion of the inner ring ($ID_{IR2}$) to allow groups of the inner rings to nest with each other to reduce the space required for stacking the inner rings during transportation and storage. The radial offset between the first and second axial end portions of the inner ring 32, 34 can vary depending on the application. The tapered roller bearing 21 can include a plurality of ribs 44, 48, shown in FIGS. 7A-7C similar to the ribs disclosed above with respect to the angular contact tandem rolling bearing 1, as well as a circumferential rib 46.

The configuration of the inner and outer rings described above provides about 25-30% reduction in total bearing mass. The reduction in the cross sectional areas of the rings also reduces forging complexity and improves flow lines, which lowers material cleanliness requirements. Due to the more uniform thickness of the rings, cycle time for forming the rings is reduced, and grinding cycle time is reduced. Due to the configurations of the rings, the inners rings can be nested with each other and the outer rings can be nested with each other to reduce space requirements of the rings during storage and transportation.

Having thus described various embodiments of the present rolling bearing in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG TO REFERENCE NUMBERS

1. Tandem Rolling Bearing
2. Outer Ring of Tandem Rolling Bearing
3. Rolling Elements
4. Inner Ring of Tandem Rolling Bearing
6. First Portion of Outer Ring
8. Second Portion of Outer Ring
10. First Raceway of Outer Ring
12. Second Raceway of Outer Ring
14. First Portion of Inner Ring
16. Second Portion of Inner Ring
18. First Raceway of Inner Ring
20. Second Raceway of Inner Ring
21. Tapered Roller Bearing
22. Outer Ring of Tapered Roller Bearing
23. Rolling Elements
24. Inner Ring of Tapered Roller Bearing
26. First Axial End Portion of Outer Ring
28. Second Axial End Portion of Outer Ring
30. Raceway of Outer Ring
32. First Axial End Portion of Inner Ring
34. Second Axial End Portion of Inner Ring
36. Raceway of Inner Ring
38. Housing
40. Shaft
42. First Cage
43. Second Cage
44. Plurality of Ribs on Outer Ring
46. Circumferential Rib on Outer Ring
48. Plurality of Ribs on Inner Ring
50. Axial End Surface of Outer Ring
52. Axial End Surface of Inner Ring

What is claimed is:

1. A rolling bearing comprising:
   an outer ring having a first portion that includes a first raceway and a second portion that includes a second raceway that has a larger diameter than the first raceway, and an outer diameter of the first portion is less than an outer diameter of the second portion, the outer ring being formed as a unitary part and having a generally uniform thickness between the first raceway and the second raceway;
   an inner ring having a first portion that includes a first raceway and a second portion that includes a second raceway that has a larger diameter than the first raceway, and an inner diameter of the first portion is less than an inner diameter of the second portion, the inner ring being formed as a unitary part and having a generally uniform thickness between the first raceway and the second raceway;
   a first plurality of rolling elements supported between the first raceway of the outer ring and the first raceway of the inner ring; and
   a second plurality of rolling elements supported between the second raceway of the outer ring and second raceway of the inner ring; and
   a radially outer surface of the outer ring includes a plurality of ribs spaced circumferentially apart from each other that extend axially between the first portion and second portion.

2. The rolling bearing of claim 1, wherein the rolling bearing is an angular contact tandem rolling bearing.

3. The rolling bearing of claim 1, wherein the outer diameter of the first portion is less than an inner diameter of the second portion.

4. The rolling bearing of claim 1, wherein the outer ring is formed from steel.

5. The rolling bearing of claim 1, wherein a circumferential rib intersects the plurality of ribs.

6. The rolling bearing of claim 1, wherein an outer surface of the outer ring has a stepped configuration.

7. The rolling bearing of claim 1, wherein the first plurality of rolling elements have a first diameter, and the second plurality of rolling elements have a second diameter, and the second diameter of the second plurality of rolling elements is greater than the first diameter of the first plurality of rolling elements.

8. The rolling bearing of claim 1, wherein the plurality of ribs extend along a tangent line that intersects a rotational axis of the rolling bearing.

9. The rolling bearing of claim 1, wherein the plurality of ribs have a profile that partially fills a step area defined between the outer diameter of the first portion of the outer ring and the outer diameter of the second portion of the outer ring.

10. The rolling bearing of claim 1, wherein the plurality of ribs extend from the first portion of the outer ring and have a profile that completely fills a step area defined between the outer diameter of the first portion of the outer ring and the outer diameter of the second portion of the outer ring.

11. A rolling bearing comprising:
an outer ring having a first portion that includes a first raceway and a second portion that includes a second raceway that has a larger diameter than the first raceway, and an outer diameter of the first portion of the outer ring is less than an outer diameter of the second portion of the outer ring, wherein a radially outer surface of the outer ring includes a first plurality of ribs spaced circumferentially apart from each other that extend axially between the first portion of the outer ring and the second portion of the outer ring, the first plurality of ribs extending along a tangent line that intersects a rotational axis of the rolling bearing;
an inner ring having a first portion that includes a first raceway and a second portion that includes a second raceway that has a larger diameter than the first raceway, and an inner diameter of the first portion of the inner ring is less than an inner diameter of the second portion of the inner ring;
a first plurality of rolling elements supported between the first raceway of the outer ring and the first raceway of the inner ring; and
a second plurality of rolling elements supported between the second raceway of the outer ring and second raceway of the inner ring.

12. The rolling bearing of claim 11, wherein the rolling bearing is an angular contact tandem rolling bearing.

13. The rolling bearing of claim 11, wherein the outer diameter of the first portion of the outer ring is less than an inner diameter of the second portion of the outer ring, and the outer diameter of the first portion of the inner ring is less than the inner diameter of the second portion of the inner ring.

14. The rolling bearing of claim 11, wherein
a radially inner surface of the inner ring includes a second plurality of ribs spaced circumferentially apart from each other that extend axially between the first portion of the inner ring and the second portion of the inner ring.

* * * * *